United States Patent
Hotta et al.

(10) Patent No.: US 10,502,148 B2
(45) Date of Patent: Dec. 10, 2019

(54) INTERNAL COMBUSTION ENGINE SYSTEM AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Shintaro Hotta, Susono (JP); Akira Kato, Shizuoka-ken (JP); Shinichi Mitani, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 148 days.

(21) Appl. No.: 15/859,312

(22) Filed: Dec. 29, 2017

(65) Prior Publication Data

US 2018/0202374 A1    Jul. 19, 2018

(30) Foreign Application Priority Data

Jan. 17, 2017    (JP) .................................. 2017-006115

(51) Int. Cl.
*F02D 41/00*    (2006.01)
*F02D 41/40*    (2006.01)
(Continued)

(52) U.S. Cl.
CPC .......... *F02D 41/0007* (2013.01); *F01L 1/047* (2013.01); *F02B 37/18* (2013.01); *F02D 13/0234* (2013.01); *F02D 23/005* (2013.01); *F02D 37/00* (2013.01); *F02D 41/0052* (2013.01); *F02D 41/38* (2013.01); *F02D 41/401* (2013.01); *F02D 43/04* (2013.01); *F02M 26/06* (2016.02); *F02M 31/20* (2013.01); *F02P 5/045* (2013.01); *F01L 13/0036* (2013.01);
(Continued)

(58) Field of Classification Search
CPC .... F02D 13/0223–0238; F02D 41/0047–0077; F02P 5/00–16
See application file for complete search history.

(56) References Cited

U.S. PATENT DOCUMENTS 6,283,096 B1 *  9/2001  Kimura ..................... F01L 9/02
                                                  123/305
6,360,541 B2    3/2002  Waszkiewicz et al.
(Continued)

FOREIGN PATENT DOCUMENTS

JP    06-108860 A     4/1994
JP    2002-339779 A   11/2002
(Continued)

*Primary Examiner* — Laert Dounis
(74) *Attorney, Agent, or Firm* — Sughrue Mion, PLLC

(57) ABSTRACT

An electronic control unit is configured to select a first cam as a driving cam of an intake valve in a first operation range where a target value of an EGR rate is set to a specified EGR rate, and is configured to select a second cam as the driving cam in a second operation range smaller in valve duration and lift amount than the first cam. Accordingly, in most of the operation regions, the first cam is selected, and the second cam is selected only in a high-torque and high-speed region. When the second cam is selected in the high-torque and high-speed region, the state where an actual compression ratio is high can be eliminated, and suction efficiency can be decreased. Therefore, decrease in a knocking limit can be suppressed.

9 Claims, 10 Drawing Sheets

(51) Int. Cl.

| | | |
|---|---|---|
| *F02B 37/18* | (2006.01) | |
| *F02P 5/04* | (2006.01) | |
| *F02M 26/06* | (2016.01) | |
| *F02D 41/38* | (2006.01) | |
| *F02D 43/04* | (2006.01) | |
| *F02D 13/02* | (2006.01) | |
| *F01L 1/047* | (2006.01) | |
| *F02M 31/20* | (2006.01) | |
| *F02D 23/00* | (2006.01) | |
| *F02D 37/00* | (2006.01) | |
| *F01L 13/00* | (2006.01) | |

(52) U.S. Cl.
CPC .... *F02D 41/0072* (2013.01); *F02D 2041/001* (2013.01); *F02D 2200/021* (2013.01); *F02D 2200/101* (2013.01); *F02D 2200/1002* (2013.01); *Y02T 10/126* (2013.01); *Y02T 10/144* (2013.01); *Y02T 10/18* (2013.01); *Y02T 10/47* (2013.01)

(56) References Cited

U.S. PATENT DOCUMENTS

| | | | |
|---|---|---|---|
| 6,382,193 | B1 | 5/2002 | Boyer et al. |
| 8,479,511 | B2 | 7/2013 | Pursifull et al. |
| 2005/0000480 | A1* | 1/2005 | Yasui ............... F01L 1/08 123/90.16 |
| 2006/0060158 | A1 | 3/2006 | Glose et al. |
| 2012/0023935 | A1 | 2/2012 | Pursifull et al. |
| 2017/0037787 | A1* | 2/2017 | Watanabe ........... F02D 13/0238 |
| 2017/0306893 | A1 | 10/2017 | Leone et al. |
| 2018/0171897 | A1* | 6/2018 | Boyer ................... F02D 41/221 |
| 2018/0209360 | A1* | 7/2018 | Kato .................. F02D 41/2422 |
| 2018/0230918 | A1* | 8/2018 | Kato .................. F02D 41/2409 |
| 2018/0306132 | A1* | 10/2018 | Hotta ..................... F02D 37/02 |

FOREIGN PATENT DOCUMENTS

| | | |
|---|---|---|
| JP | 2006-528745 A | 12/2006 |
| JP | 2007292065 A | 11/2007 |

* cited by examiner

INTERNAL COMBUSTION ENGINE SYSTEM AND CONTROL METHOD FOR INTERNAL COMBUSTION ENGINE

INCORPORATION BY REFERENCE

The disclosure of Japanese Patent Application No. 2017-006115 filed on Jan. 17, 2017 including the specification, drawings and abstract is incorporated herein by reference in its entirety.

BACKGROUND

1. Technical Field

The present disclosure relates to internal combustion engine systems and control methods for internal combustion engines, and relates more specifically to an internal combustion engine system and a control method for an internal combustion engine that control engine output by changing operational characteristics of an intake valve.

2. Description of Related Art

Disclosed in Japanese Patent Application Publication No. 6-108860 is a controller of an internal combustion engine, the controller being configured to change a closing time of an intake valve by switching two types of intake cams in accordance with an operating state of an engine with a supercharger. In this conventional controller, a low-speed intake cam is selected at a low-speed side of a high-load region, and a high-speed intake cam is selected at a high-speed side of the high-load region. When the low-speed cam is selected, the intake valve is closed at a prescribed time that is earlier than a bottom dead center. When the high-speed cam is selected, the intake valve is closed at a time later than the prescribed time.

When the low-speed cam is used, the intake valve is closed earlier than the bottom dead center, so that a compression end temperature lowers. This makes it possible to increase a knocking limit. In addition, supercharging effects of the supercharger can also increase the amount of air charged into a cylinder. Therefore, according to the conventional controller, the engine output can be enhanced at the low-speed side of the high-load region. However, when engine speed increases and the operating state shifts to the high-speed side of the high-load region, a substantial intake term is shortened, and the amount of air charged into the cylinder decreases. Moreover, when the amount of air sucked by the engine decreases relative to the amount of air discharged from the supercharger, a supercharging pressure increases in proportion to the decreased air amount. In such a situation, when the high-speed cam is used, the intake valve can be closed later than the case of using the low-speed cam. Therefore, the conventional controller can compensate the decrease in the amount of air charged to the cylinder at the high-speed side of the high-load region. It is also possible to suppress excessive increase in the supercharging pressure.

SUMMARY

The knocking limit can also be improved by introducing an external EGR gas into the cylinder. Furthermore, when the external EGR gas is introduced, the knocking limit can be improved without relying on early closing of the intake valve with use of the low-speed cam. That is, when the external EGR gas is used, the amount of air charged to the cylinder can still be increased even if closing of the intake valve is delayed by using the high-speed cam at the low-speed side of the high-load region. In addition, when the supercharger is driven, the supercharging operation can further increase the amount of air changed to the cylinder. Therefore, the output of the supercharged engine at the low-speed side of the high-load region can further be enhanced.

However, an EGR rate expressed as a ratio of the external EGR gas to intake air is generally designed such that an optimum target value is selected in accordance with the operating state of the engine, as in the case of two types of intake cams described before. The target EGR rate is generally set to a highest value in a middle-load region that is adjacent to the high-load region. Accordingly, a problem arises when the operating state of the engine shifts from the middle-load region to the high-load region. Specifically, the problem is a lowered knocking limit due to reduction in the target EGR rate when the operating state of the engine shifts from the middle-load region to the high-load region. Therefore, an improvement different from the conventional improvement needs to be made in order to enhance the output of the supercharged engine that combines switching of a plurality of types of intake cams with the EGR rate.

The present disclosure suppresses decrease in engine output in a turbocharged engine when an operating state shifts from an operating region where an EGR rate target value is high to an operating region where the EGR rate target value is low, the turbocharged engine being configured to enhance the engine output based on a combination of an intake cam selected in accordance with the operating state and the EGR rate.

A first aspect of the present disclosure relates to an engine system. The internal combustion engine system includes a turbocharged engine and an electronic control unit. The turbocharged engine includes a plurality of intake cams different in cam profile, an EGR system, and an ignition device. The intake cams are configured to drive an intake valve. The EGR system is configured to introduce exhaust gas flowing through an exhaust system, as an external EGR gas, into an intake system. The ignition device is configured to ignite an air-fuel mixture in a cylinder. The electronic control unit is configured to set a target value of an EGR rate in accordance with an operating state identified with engine torque and engine speed. The EGR rate is expressed as a ratio of the external EGR gas to intake air. In a first operation region where the target value of the EGR rate is set to a specified EGR rate, the electronic control unit is configured to select a first cam as a driving cam of the intake valve and is configured to set closing timing of the intake valve to a first crank angle section. The first crank angle section includes a crank angle that offers a highest suction efficiency under a condition where the engine speed and turbocharging pressure are fixed. In a second operation region, the electronic control unit is configured to select a second cam as the driving cam, the second cam is smaller in valve duration and lift amount than the first cam, and is configured to set the closing timing to a second crank angle section and change the ignition timing of the ignition device to a more advanced side than the ignition timing of the ignition device in the first operation region. The second operation region is positioned closer to a high-speed side than the first operation region. The second operation region has the target value of the EGR rate set to a value lower than the specified EGR rate. The second crank angle section is positioned at a more advanced side than the first crank angle section, and is lower in suction efficiency than the first crank angle section.

With the configuration, when the operating state is in the first operation region, the first cam may be selected as the driving cam of the intake valve, and the intake valve may be closed in the first crank angle section. When the operating state is in the first operation region, the high target value of the EGR rate is set high, and therefore the knocking limit is high. The first crank angle section includes a crank angle that offers the highest suction efficiency under the condition where the engine speed and turbocharging pressure are fixed. Accordingly, the engine output can be enhanced by selecting the first cam and closing the intake valve in the first crank angle section.

With the configuration, when the operating state is in the second operation region, the second cam may be selected as the driving cam of the intake valve, the intake valve may be closed in the second crank angle section, and the air-fuel mixture may be ignited at ignition timing more advanced than the ignition timing in the first operation region. When the operating state is in the second operation region, the target value of the EGR rate is set lower than the target value set when the operating state is in the first operation region. Accordingly, the knocking limit lowers. In this regard, the second cam is smaller in valve duration and lift amount than the first cam, and the second crank angle section is positioned at a more advanced side than the first crank angle section and is lower in suction efficiency than the first crank angle section. Accordingly, when the second cam is selected and the intake valve is closed in the second crank angle section, the suction efficiency is lowered, and decrease in knocking limit can be suppressed. Moreover, when the air-fuel mixture is ignited at the ignition timing more advanced than the ignition timing in the first operation region, the decreased suction efficiency can be compensated, and the decrease in knocking limit can be suppressed.

In the internal combustion engine system, the electronic control unit may be configured to wait for the switching of the driving cam until change of an actual EGR rate is completed when switching the driving cam from the first cam to the second cam with a shift of the operating state from the first operation region to the second operation region.

When the target value of the EGR rate is changed, the change is reflected on an actual EGR rate with a time lag. When the driving cam is switched while the actual EGR rate is changing, combustion becomes unstable and torque fluctuation increases. With the configuration, switching from the first cam to the second cam can be waited for the switching of the driving cam until the change of the actual EGR rate is completed. Therefore, stable combustion and less torque fluctuation can be achieved.

In the internal combustion engine system, the turbocharged engine may include an injector that supplies fuel into a cylinder. The electronic control unit may be configured to control the injector such that the fuel is injected in a compression stroke when the operating state is in the first driving range. The electronic control unit may be configured to control the injector such that the fuel is injected in an intake stroke when the operating state is in the second driving range.

The second cam is smaller in valve duration and lift amount than the first cam. Accordingly, when the second cam is selected as the driving cam, turbulence in the cylinder becomes smaller than the turbulence generated when the first cam is selected as the driving cam, which leads to decrease in combustion speed. With the configuration, the injector can be controlled such that the fuel is injected in the intake stroke when the operating state is in the second operation region. This promotes mixing of intake air and fuel, so that reduction in engine output can be suppressed.

In the internal combustion engine system, the electronic control unit may be configured to wait for the switching of the driving cam until change of injection timing of the injector is completed when switching the driving cam from the first cam to the second cam with a shift of the operating state from the first operation region to the second operation region.

When the driving cam is switched while the fuel injection timing of the injector is changing, combustion becomes unstable, and torque fluctuation increases. With the configuration, switching from the first cam to the second cam can be waited for until the change of the fuel injection timing of the injector is completed. Therefore, stable combustion and less torque fluctuation can be achieved.

In the internal combustion engine system, the turbocharged engine may include a camshaft that supports the plurality of intake cams, and a rotation phase change mechanism that changes a rotation phase of the camshaft relative to a crankshaft. When switching the driving cam from the first cam to the second cam with a shift of the operating state from the first operation region to the second operation region, the electronic control unit may be configured to change the rotation phase such that the suction efficiencies before and after the switching of the driving cam coincide, and wait for the switching of the driving cam until change of the rotation phase is completed.

With the configuration, the rotation phase of the camshaft relative to the crankshaft can be changed such that the suction efficiencies before and after the switching of the driving cam coincide. The switching of the driving cam can be waited for until change of the rotation phase is completed. Therefore, combustion before and after the switching of the driving cam can be stabilized, and torque fluctuation can be decreased.

In the internal combustion engine system, the turbocharged engine may include a liquid-cooled intercooler that cools the intake air flowing through the intake system, and a heat exchanger that shares a coolant with the intercooler. The electronic control unit may be configured not to perform switching of the driving cam when following conditions i) and ii) are bath satisfied, i) switching the driving cam from the first cam to the second cam with a shift of the operating state from the first operation region to the second operation region, and ii) temperature of the coolant fed to the intercooler and the heat exchanger is higher than a specified temperature.

With the configuration, the switching of the driving cam itself can be prohibited when the temperature of the coolant fed to the intercooler and to the heat exchanger is higher than the specified temperature. Therefore, excessive temperature increase in the heat exchanger can be suppressed.

In the internal combustion engine system, in a third operation region, the electronic control unit may be configured to select a third cam as the driving cam, the third cam is smaller in lift amount than the first cam and smaller in valve duration than the second cam, and may be configured to set the closing timing to a third crank angle section and change the ignition timing of the ignition device to a more advanced side than the ignition timing of the ignition device in the first operation region. The third operation region may be positioned closer to a low speed side than the first operation region. The third operation region may have the target value of the EGR rate set to a value lower than the specified EGR rate. The third crank angle section may be positioned at a more advanced side than the first crank angle section, and may be narrower than the second crank angle section.

With the configuration, when the operating state is in the third operation region, the third cam may be selected as the driving cam of the intake valve, the intake valve may be closed in the third crank angle section, and the air-fuel mixture may be ignited at the ignition timing more advanced than the ignition timing in the first operation region. When the operating state is in the third operation region, the target value of the EGR rate is set lower than the target value set when the operating state is in the first operation region. Accordingly, the knocking limit lowers. In this regard, the third cam is smaller in lift amount than the first cam, and is smaller in valve duration than the second cam. The third crank angle section is also positioned at a more advanced side than the first crank angle section and is narrower than the second crank angle section. Accordingly, when the third cam is selected and the intake valve is closed in the third crank angle section, the suction efficiency can be lowered, and the decrease in knocking limit can be suppressed. Moreover, when the air-fuel mixture is ignited at the ignition timing more advanced than the ignition timing in the first operation region, the decreased suction efficiency can be compensated, and the decrease in engine output can be suppressed.

In the internal combustion engine system, the turbocharged engine may have a geometric compression ratio of 11 or more.

With the configuration, the engine output of the turbocharged engine having a geometric compression ratio as high as 11 or more can be enhanced.

A second aspect of the present disclosure relates to a control method for an internal combustion engine. The internal combustion engine includes a turbocharged engine and an electronic control unit. The turbocharged engine includes a plurality of intake cams different in cam profile, an EGR system, and an ignition device. The intake cams are configured to drive an intake valve. The EGR system is configured to introduce exhaust gas flowing through an exhaust system, as an external EGR gas, into an intake system. The ignition device is configured to ignite an air-fuel mixture in a cylinder. The electronic control unit is configured to set a target value of an EGR rate in accordance with an operating state identified with engine torque and engine speed. The EGR rate is expressed as a ratio of the external EGR gas to intake air. The control method includes, in a first operation region where the target value of the EGR rate is set to a specified EGR rate, selecting, the electronic control unit, a first cam as a driving cam of the intake valve, and setting, the electronic control unit, closing timing of the intake valve to a first crank angle section including a crank angle that offers a highest suction efficiency under a condition where the engine speed and turbocharging pressure are fixed, and in a second operation region, selecting, the electronic control unit, a second cam as the driving cam, setting, the electronic control unit, the closing timing to a second crank angle section positioned at a more advanced side than the first crank angle section, and changing, the electronic control unit, ignition timing of the ignition device to a more advanced side than the ignition timing of the ignition device in the first operation region. The second operation region is positioned closer to a high-speed side than the first operation region. The second operation region has the target value of the EGR rate set to a value lower than the specified EGR rate. The second cam is smaller in valve duration and lift amount than the first cam. The second crank angle section is lower in suction efficiency than the first crank angle section.

With the configuration, when the operating state is in the first operation region, the first cam may be selected as the driving cam of the intake valve, and the intake valve may be closed in the first crank angle section. When the operating state is in the first operation region, the target value of the EGR rate is set high, and therefore the knocking limit is high. The first crank angle section includes a crank angle that offers the highest suction efficiency under the condition where the engine speed and turbocharging pressure are fixed. Accordingly, the engine output can be enhanced by selecting the first cam and closing the intake valve in the first crank angle section.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below based on the drawings. Note that elements identical in each of the drawings are designated by identical reference signs to omit redundant description. The following embodiments are not intended to limit the present embodiment.

First, a first embodiment of the present disclosure will be described with reference to FIGS. 1 through 10.

Figure 1:
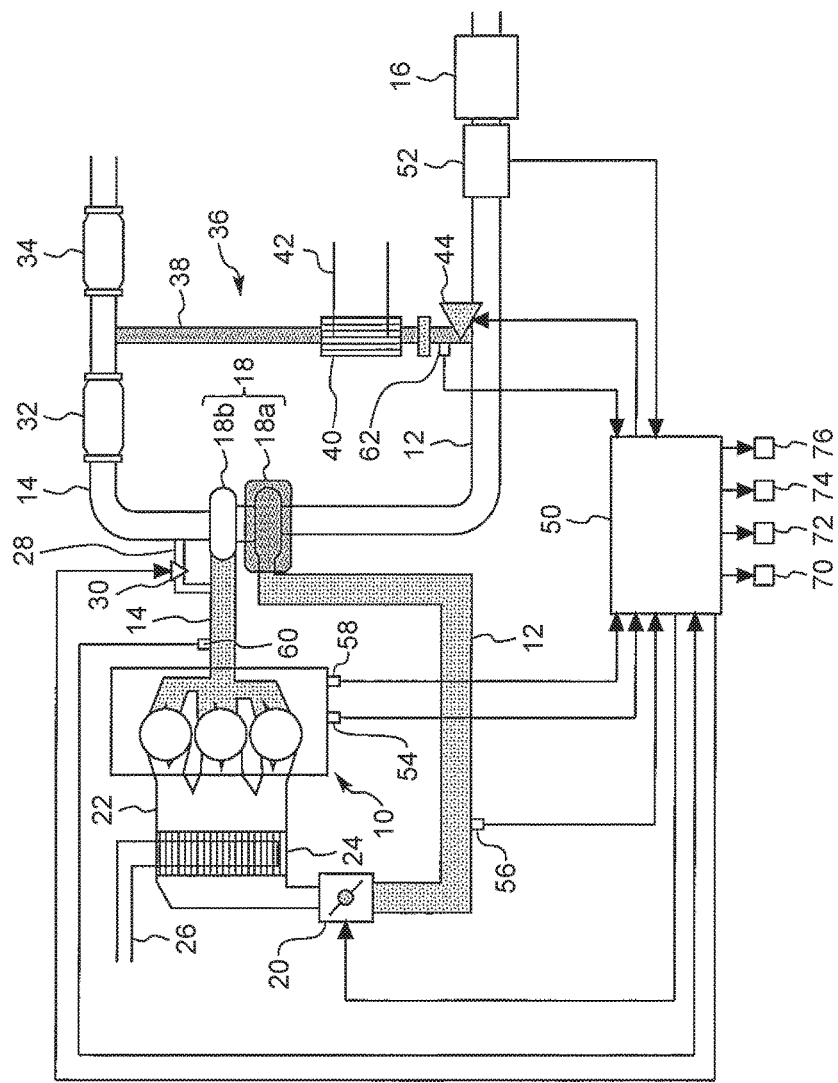
FIG. 1 is a schematic view illustrating a configuration example of a system according to a first embodiment of the present disclosure.

FIG. 1 is a schematic view illustrating a configuration example of a system according to the first embodiment of the present disclosure. The system illustrated in FIG. 1 is a system for an internal combustion engine mounted on a vehicle. The system illustrated in FIG. 1 includes an internal combustion engine 10 as a driving source. The internal combustion engine 10 is a four-stroke cycle reciprocating engine, and is also an inline three-cylinder engine. The number of cylinders and cylinder arrangement of the internal combustion engine 10 are not particularly limited. The internal combustion engine 10 has a relatively high geometric compression ratio of 11 or more. Each cylinder of the internal combustion engine 10 communicates with an intake pipe 12 and an exhaust pipe 14.

A description is first given of an intake system of the internal combustion engine 10. In the vicinity of an inlet of the intake pipe 12, an air cleaner 16 is attached. Provided downstream of the air cleaner 16 is a compressor 18a of a turbocharger 18. The compressor 18a that is driven by rotation of a turbine 18b provided in the exhaust pipe 14 compresses intake air. Provided downstream of the compressor 18a is an electronically controlled throttle valve 20. Provided downstream of the throttle valve 20 is an intake manifold 22 connected to an intake port of each cylinder. The intake manifold 22 incorporates a liquid-cooled intercooler 24. The intake air flowing into the intercooler 24 is cooled through heat exchange with a coolant flowing through a cooling pipe 26.

A description is now given of an exhaust system of the internal combustion engine 10. The exhaust pipe 14 is equipped with the turbine 18b of the turbocharger 18. The turbine 18b is coupled with the compressor 18a. The turbine 18b rotates with the energy of exhaust gas flowing through the exhaust pipe 14. In the middle of the exhaust pipe 14, a bypass pipe 28 that bypasses the turbine 18b is provided. The bypass pipe 28 is provided with a waste gate valve (WGV) 30. The WGV 30 is opened when an exhaust pipe pressure (back pressure) on the upstream side of the turbine 18b becomes higher than a stipulated value. When the WGV 30 is opened, some of the exhaust gas flowing an upstream portion of the turbine 18b flows through the bypass pipe 28 into a downstream portion of the turbine 18b. Provided on the downstream of the turbine 18b are catalysts 32, 34 for cleaning the exhaust gas.

Next, an EGR system of the internal combustion engine 10 will be described. The internal combustion engine 10 includes a low pressure loop-EGR (LPL-EGR) system 36. The LPL-EGR system 36 includes an EGR pipe 38 that connects a portion of the exhaust pipe 14 positioned between the catalyst 32 and the catalyst 34 to a portion of the intake pipe 12 on the upstream side of the compressor 18a. In the middle of the EGR pipe 38, a liquid-cooled EGR cooler 40 is provided. The exhaust gas (i.e., external EGR gas) flowing into the EGR cooler 40 is cooled through heat exchange with a coolant flowing through a condenser tube 42. Provided on the downstream of the EGR cooler 40 is an electrically controlled EGR valve 44. When an opening degree of the EGR valve 44 is changed, the flow rate of the external EGR gas flowing from the EGR pipe 38 into the intake pipe 12 is changed. As the opening degree of the EGR valve 44 becomes larger, the EGR rate becomes higher.

Figure 2:
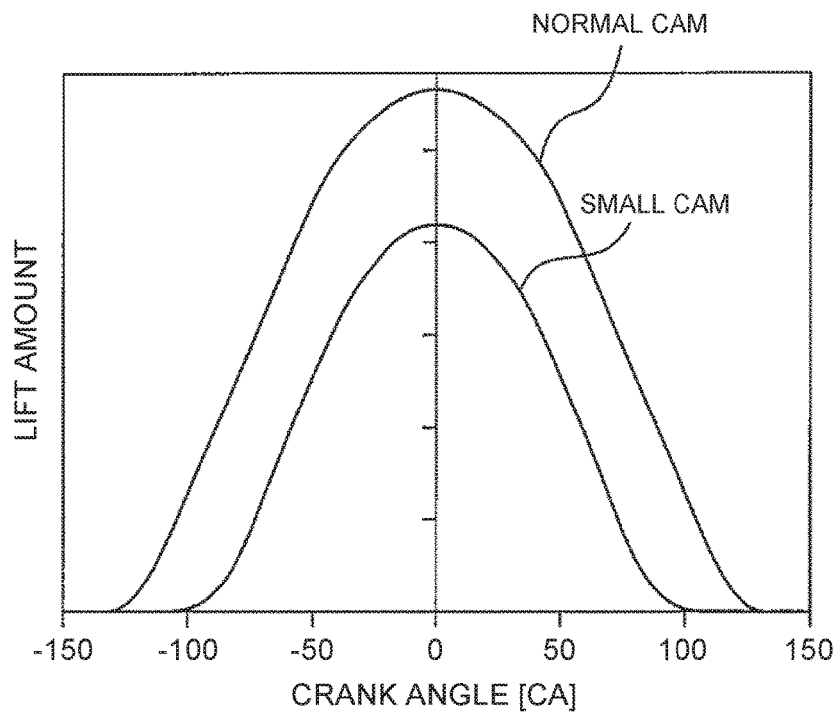
FIG. 2 is an explanatory view illustrating one example of cam profiles of two types of intake cams included in the system according to the first embodiment of the present disclosure.

A description is now given of a valve system of the internal combustion engine 10. FIG. 2 is an explanatory view illustrating examples of the cam profiles (the cam profiles represent at least one of a lift amount and valve duration, and this applies to the following description) of two types of intake cams included in the system according to the first embodiment of the present disclosure. Note that "valve duration" means the length of time, in degrees, that a valve is held open. As illustrated in FIG. 2, the system according to the first embodiment includes two types of intake cams: a normal cam; and a small cam. The small cam is smaller in valve duration and lift amount than the normal cam. The normal cam and the small cam are supported by a camshaft rotated in synchronization with a crankshaft. Two pairs of the normal and small cams are supported in every cylinder. This is because two intake valves are provided in every cylinder. However, the number of the intake valves per cylinder may be one, or may be three or more in the present disclosure.

The camshaft that supports the normal cam and the small cam is provided with a variable valve timing mechanism (VVT). The VVT is a mechanism that changes valve opening characteristics of the intake valve by changing a rotation phase difference of the camshaft relative to the crankshaft. The VVT includes a housing that is coupled with the crankshaft through a timing chain and the like, and a vane body that is provided in the housing and attached to an end portion of the camshaft. When hydraulic pressure is supplied to the inside of a hydraulic pressure chamber sectioned by the housing and the vane body, the vane body can be rotated relative to the housing. As a result, the rotation phase difference of the camshaft relative to the crankshaft can be changed. The hydraulic pressure supplied to the VVT is controlled with a hydraulic control valve provided in a hydraulic pressure supply line. The structure of the VVT is publicly known. Since there are no restrictions on the configuration of the VVT in the present disclosure, a further description about the VVT is omitted.

With reference again to FIG. 1, the configuration example of the system will be described further. The system illustrated in FIG. 1 includes an electronic control unit (ECU) 50 as a controller. The ECU 50 includes a random-access memory (RAM), a read-only memory (ROM), and a microprocessor (CPU). The ECU 50 takes in and processes signals of various sensors mounted on the vehicle. The various sensors include an air flowmeter 52, a crank angle sensor 54, a turbocharging pressure sensor 56, a coolant temperature sensor 58, a back pressure sensor 60, and a gas temperature sensor 62. The air flowmeter 52 is provided in the vicinity of the air cleaner 16 to detect the amount of suction air. The crank angle sensor 54 outputs a signal corresponding to the rotation angle of the crankshaft. The turbocharging pressure sensor 56 detects the pressure of a portion of the intake pipe (turbocharging pressure) on the upstream side of the throttle valve 20. The coolant temperature sensor 58 detects the temperature of the coolant in the internal combustion engine 10. The back pressure sensor 60 detects the pressure of a portion of the exhaust pipe (back pressure) on the upstream side of the turbine 18b. The gas temperature sensor 62 detects the temperature of the exhaust gas at an outlet portion of the EGR cooler 40.

The ECU 50 processes the taken-in signals of the various sensors, and operates various actuators in accordance with specified control programs. The various actuators include the throttle valve 20 and the WGV 30. The various actuators also include an injector 70 that injects fuel into the cylinder, an ignition device 72 that ignites an air-fuel mixture in the cylinder, a VVT 74, and a cam switching mechanism 76 that switches the intake cams (also referred to as "driving cams" below) that drive the intake valve.

Figure 3:
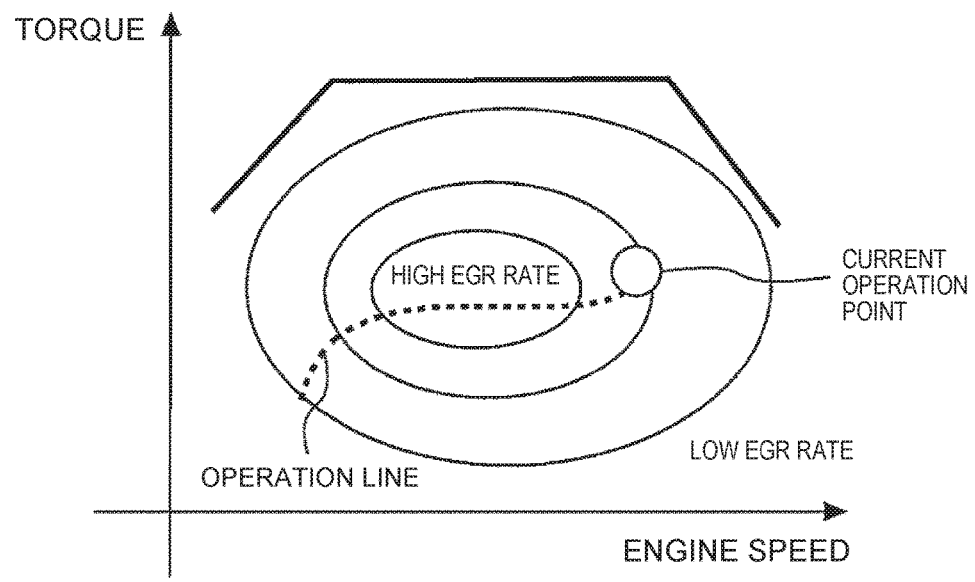
FIG. 3 illustrates one example of a relation between an engine operation region and a target EGR rate.

FIG. 3 illustrates one example of a relation between an engine operation region and a target EGR rate (a target value of the EGR rate). The relation of FIG. 3 is prepared based on prior simulation. As indicated by contour lines in FIG. 3, the target EGR rate is set to a highest value in a middle-torque and middle-speed region. This is to enhance the EGR rate in the middle-torque and middle-speed region that is particularly high in use frequency so as to enhance thermal efficiency. Lower target EGR rates are set for peripheral regions more distanced from the middle-torque and middle-speed region, the peripheral regions being relatively low in use frequency. Specifically, in a high torque region and a low torque region, the target EGR rate is set to a lower value than that of the middle torque region. Similarly, in a high speed region or a low speed region, the target EGR rate is set to a lower value than that of the middle speed region. In the first embodiment, the relation illustrated in FIG. 3 is stored in the ROM of the ECU. The opening degree of the EGR valve is controlled by applying an actual operating state to the relation.

Figure 4:
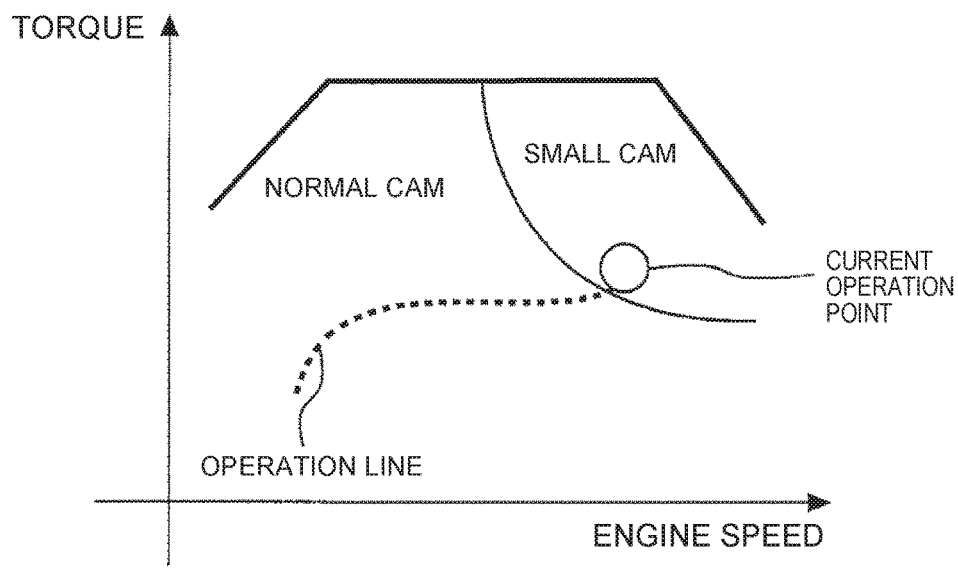
FIG. 4 illustrates one example of a relation between the engine operation region and the cams that drive an intake valve.

In the first embodiment, in order to enhance the engine output, engine control that combines the target EGR rate with the closing time of the intake valve is performed. FIG. 4 illustrates one example of a relation between the engine operation region and the cams that drive the intake valve. As illustrated in FIG. 4, in most of the operation regions, the normal cam is selected. The small cam is selected only in the high-torque and high-speed region. In the first embodiment, the relation illustrated in FIG. 4 is stored in the ROM of the ECU. The switching operation by the cam switching mechanism is controlled by applying an actual operating state to the relation.

Figure 5:
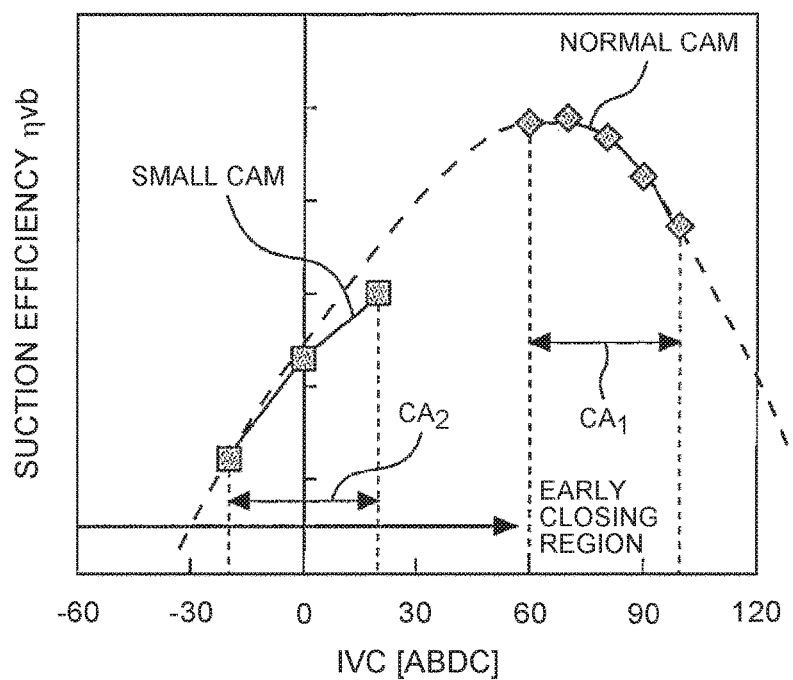
FIG. 5 is an explanatory view illustrating one example of closing time of the intake valve.

FIG. 5 is an explanatory view illustrating one example of the closing time of the intake valve. As illustrated in FIG. 5, when the driving cam is the normal cam, the intake valve is closed in a crank angle section $CA_1$ that is later than a bottom dead center (ABDC=0). When the driving cam is the small cam, the intake valve is closed early in the crank angle section $CA_2$ that includes the bottom dead center. The crank angle sections $CA_1$, $CA_2$ illustrated in FIG. 5 have widths because the closing time of the intake valve is changed by the VVT. However, when the normal cam with a large lift amount is used as the driving cam in order to enhance the engine output in the frequently-used operation region, the crank angle section $CA_1$ is set so as to include the crank angle that offers maximum suction efficiency. When the small cam with a small lift amount is used as the driving cam, the crank angle section $CA_2$ is set so as to exclude the crank angle that offers the maximum suction efficiency. The suction efficiency illustrated in FIG. 5 may be obtained under the operating condition where the engine speed and the turbocharging pressure are fixed, for example.

In FIG. 5, the small cam is selected in the high-torque and high-speed region because knocking tends to occur when the normal cam is selected in this operation region. The knocking tends to occur in the range of the middle torque region to the high torque region. As described in FIG. 3, in the middle-torque and middle-speed region, the target EGR rate is set to a high value. This means that the knocking limit is increased. As described in FIG. 3, in the high-torque and high-speed region, the target EGR rate is set to a value lower than that in the middle-torque and middle-speed region. Accordingly, when the engine operating state shifts as indicated by an operation line illustrated in FIG. 3, the target EGR rate gradually increases to a maximum value, and then decreases to a current operation point. Therefore, if the normal cam should continue to be selected over the period of the operation line, the state where an actual compression ratio is high continues although the knocking limit decreases with the decrease in the target EGR rate. Therefore, there is no other choice but to delay the ignition timing, and this leads to the situation where decrease in engine output is unavoidable.

To cope with this situation, in the first embodiment, the small cam is selected in the high-torque and high-speed region. Accordingly, the state where the actual compression ratio is high can be eliminated, and the suction efficiency can be decreased. This makes it possible to suppress the decrease in the knocking limit and to thereby avoid delay of the ignition timing. In the high-torque and high-speed region, the back pressure is high. Accordingly, when the normal cam is selected, the back pressure largely exceeds the stipulated value, and therefore the WGV is opened. However, when the normal cam is switched to the small cam, the suction efficiency is intentionally decreased, which leads to decrease in the back pressure. As a result, the opening degree of the WGV is reduced as the back pressure becomes less than the stipulated value. Consequently, it becomes possible to increase the turbocharging pressure and to thereby compensate the decrease in the suction efficiency caused by selection of the small cam. This makes it possible to enhance the engine output.

Figure 6:
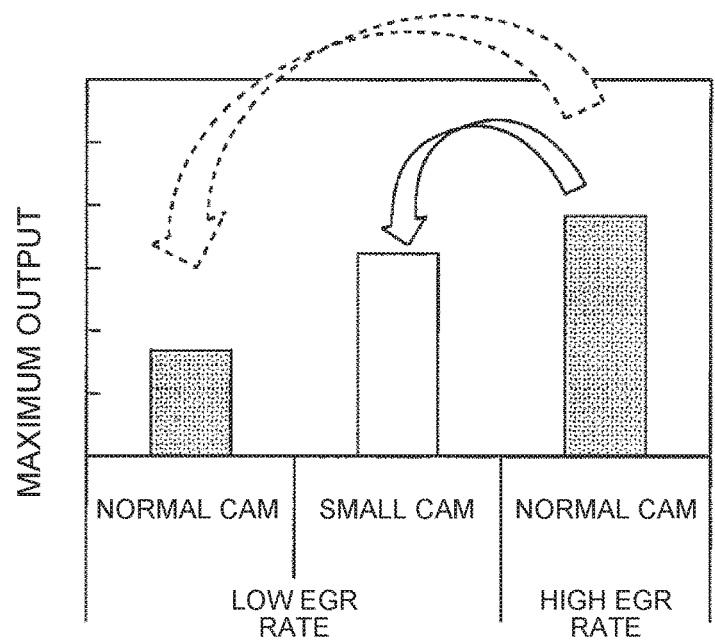
FIG. 6 is an explanatory view illustrating effects obtained by engine control in the first embodiment of the present disclosure.

FIG. 6 is an explanatory view illustrating effects obtained by engine control in the first embodiment of the present disclosure. As illustrated in FIG. 6, when the normal cam is continuously selected when the EGR rate is decreased, the maximum engine output decreases after the decrease in the EGR rate (dashed arrow line). In the first embodiment, since the normal cam is switched to the small cam when the EGR rate is decreased, the decrease in the maximum engine output can be suppressed (solid arrow line). The value of the decreased EGR rate may be zero, or may be larger than zero.

Figure 7:
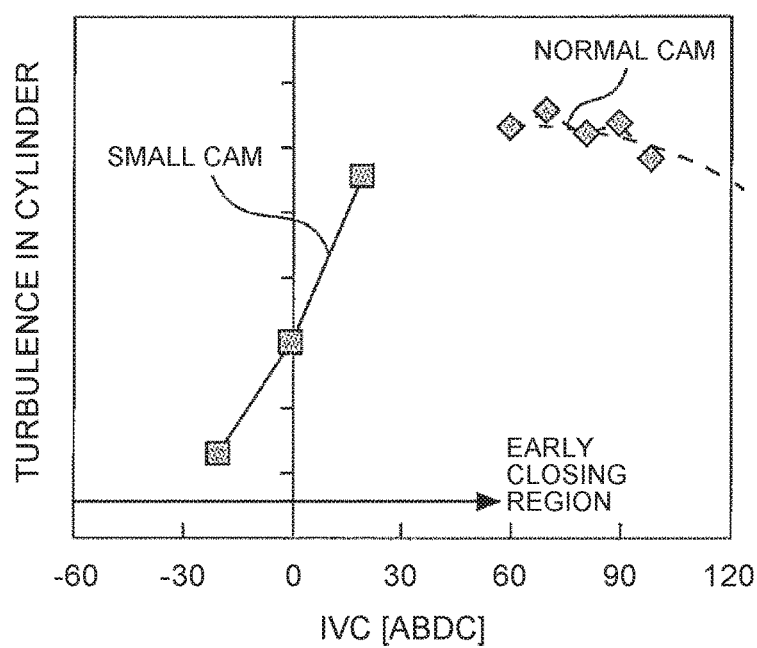
FIG. 7 illustrates one example of a relation between the closing time of the intake valve and turbulence in a cylinder.

Now, when the driving cam is switched from the normal cam to the small cam, and the closing time of the intake valve is changed, not only the suction efficiency but also the combustion speed decrease. FIG. 7 illustrates one example of a relation between the closing time of the intake valve and turbulence in the cylinder. As illustrated in FIG. 7, when the driving cam is the small cam, the turbulence in the cylinder becomes smaller than when the driving cam is the normal cam. Accordingly, when the driving cam is switched from the normal cam to the small cam, combustion speed may be slowed and the engine output may decrease. However, in the internal combustion engine with a high geometric compression ratio as in the first embodiment, increase in the turbocharging pressure relating to decrease in the suction efficiency has a larger impact than the decrease in the combustion speed. As a result, the decrease in the engine output is suppressed (see FIG. 6). In this connection, in general turbocharged engines having a geometric compression ratio of about 10, the impact of the decrease in the combustion speed becomes relatively larger. As a result, the engine output tends to be decreased.

Figure 8:
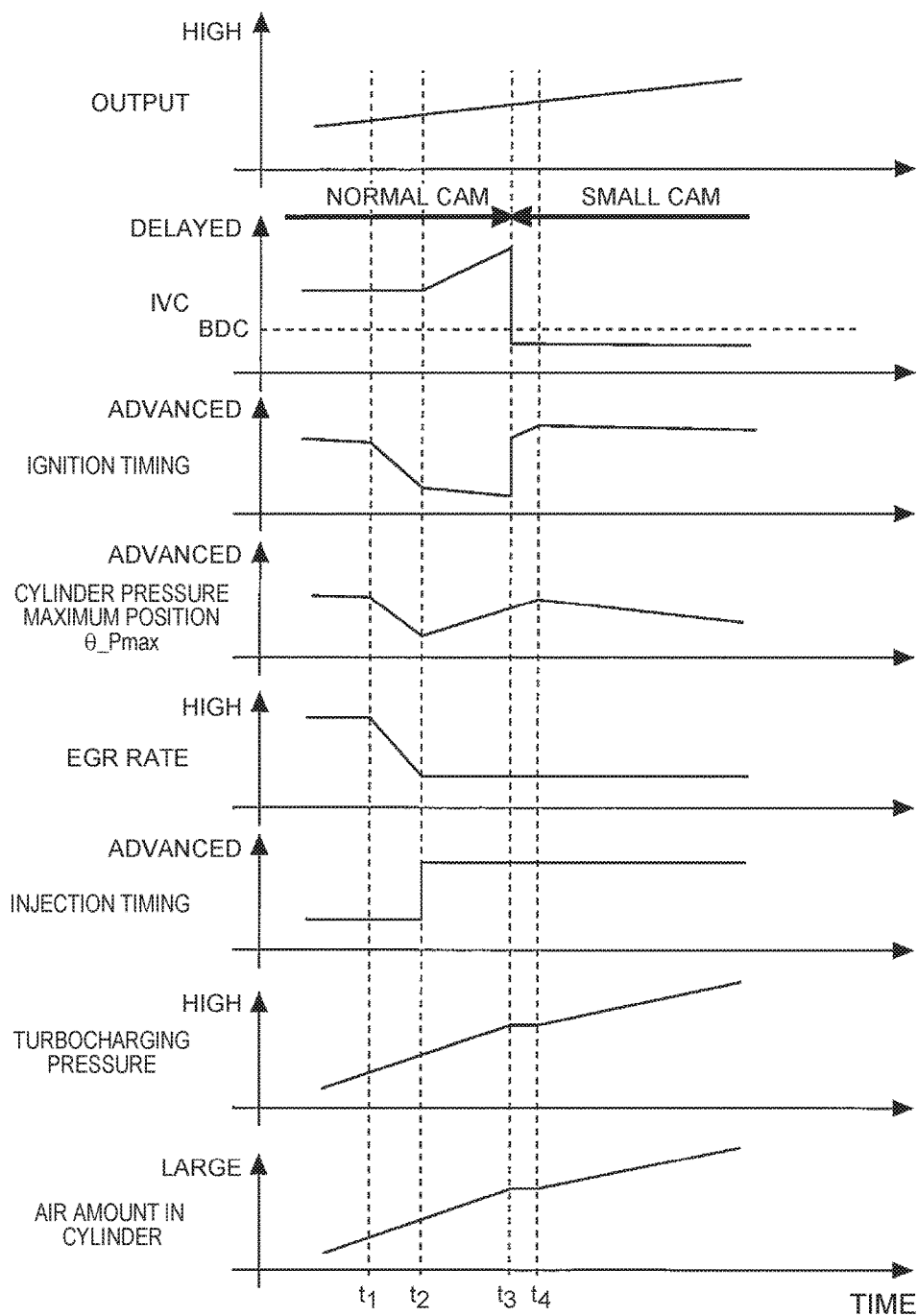
FIG. 8 is a time chart illustrating an engine control example of in the first embodiment of the present disclosure.

Next, with reference to FIG. 8, a specific example of the engine control in the first embodiment will be described. FIG. 8 is a time chart illustrating an example of the engine control in the first embodiment of the present disclosure. The time chart of FIG. 8 depicts transition of various physical values and control parameters when the operating state of the engine shifts from a region high in the EGR rate (i.e., middle-torque and middle-speed region) to a region low in the target EGR rate (i.e., high-torque and high-speed region) along the operation line described in FIG. 3. Accordingly, an EGR rate illustrated in FIG. 8 decreases at time $t_1$, while the turbocharging pressure and the air amount in the cylinder illustrated in FIG. 3 continue to increase in general.

As illustrated in FIG. 8, the EGR rate decreases in a period from time $t_1$ to time $t_2$. This is because the opening degree of the EGR valve is changed to a closed side with decrease in the target EGR rate described in FIG. 3. When the EGR rate decreases, the knocking limit lowers. Accordingly, while the EGR rate is changing, the ignition timing continues to be changed to a delayed side. With the ignition timing being delayed, a crank angle θ_Pmax at which the pressure inside the cylinder becomes maximum moves to the delayed side.

In the first embodiment, the driving cam is not switched while the EGR rate is changing. The reason is that combustion becomes unstable and torque fluctuation increases when the driving cam is switched from the normal cam to the small cam concurrently with the change in the actual EGR valve. Furthermore, switching of the driving cam is not yet started at time $t_2$ at which change of the EGR rate completes. The switching of the driving cam is in a standby state up to time $t_3$. At time $t_2$, instead of switching the driving cam, the injection timing of fuel is changed to an advanced side. The injection timing is changed from a crank angle in the compression stroke to a crank angle in the intake stroke. The reason is that when the driving cam is the normal cam, the turbulence in the cylinder can be secured and the engine output can increase, whereas after the driving cam is switched to the small cam, the turbulence in the cylinder decreases. Therefore, at time $t_2$ when the injection timing is advanced and changed to the crank angle in the intake stroke, mixing of intake air and fuel can be promoted, so that decrease in the engine output can be suppressed.

Figure 9:
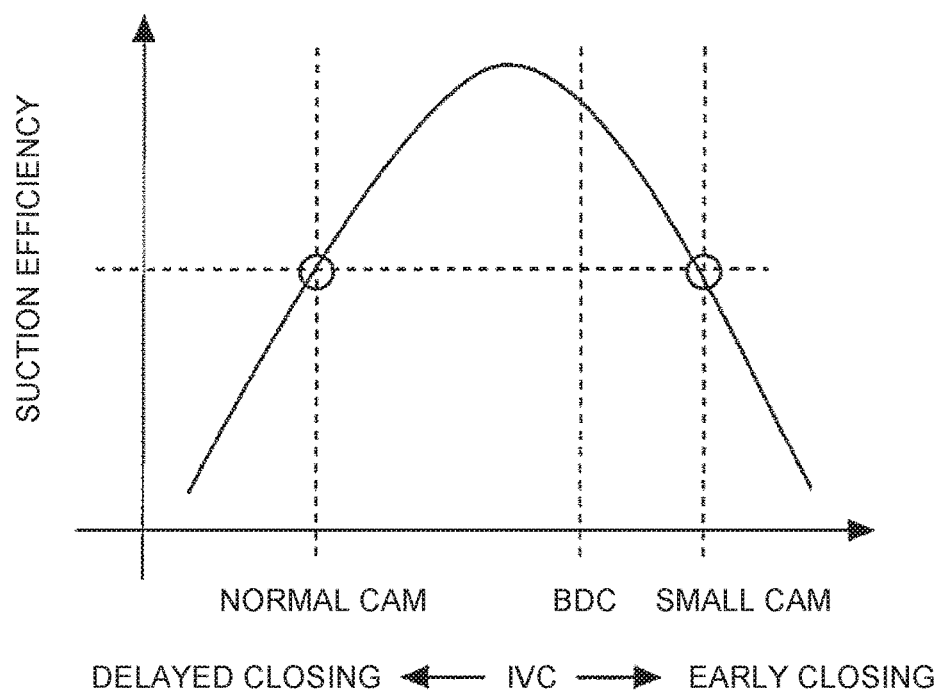
FIG. 9 is an explanatory view illustrating one example of a relation between the valve closing time of the intake valve and suction efficiency.

In the first embodiment, the valve closing time of the intake valve starts to be changed to the delayed side at time $t_2$. The valve closing time is changed to the delayed side while the driving cam is the normal cam by controlling the hydraulic control valve of the VVT such that the suction efficiencies before and after the switching of the driving cam coincide. FIG. 9 is an explanatory view illustrating one example of a relation between the valve closing time of the intake valve and suction efficiency. As illustrated in FIG. 9, the suction efficiency demonstrates the characteristics of being substantially symmetrical about the center of the crank angle in the vicinity of the bottom dead center. The crank angle at the center of symmetry does not coincide with the bottom dead center due to the influence of the turbocharging pressure. A difference in valve duration between the normal cam and the small cam is already known in the design phase of the cam. Accordingly, based on the characteristics illustrated in FIG. 9, the valve closing time of the intake valve at which the suction efficiencies before and after the switching of the driving cam coincide can be identified.

Switching of the driving cam is started at time $t_3$ when the change in the valve closing time of the intake valve by the VVT is completed. The reason is that combustion becomes unstable and torque fluctuation increases when the driving cam is switched from the normal cam to the small cam concurrently with the change in the injection timing or the change in the valve closing timing of the intake valve. At time $t_3$, the ignition timing is also changed to the advanced side. An advance degree of the ignition timing at time $t_3$ is set to a value that causes the crank angle θ_Pmax that maximizes the pressure in the cylinder to be substantially equal to the crank angle θ_Pmax at time $t_1$. However, the ignition timing at time $t_3$ is changed to be more advanced than the ignition timing at time $t_1$. By such a change in the ignition timing to the advanced side, the decrease in the suction efficiency and combustion speed relating to switching of the driving cam is compensated, and decrease in the engine output is suppressed.

As described before, when the small cam is selected in high-torque and high-speed region, decrease in the knocking limit can be suppressed. Accordingly, the ignition timing changed at time $t_3$ continues to be changed further to the advanced side for a while after time $t_3$. After time $t_4$ when switching to the small cam is completed, the opening degree of the WGV reduces with intentional decrease in the suction efficiency. Accordingly, the turbocharging pressure that tends to increase until time $t_3$ further increases after $t_4$. The air amount in the cylinder also increases with increase of the turbocharging pressure after time $t_4$. Therefore, as illustrated in an uppermost column in FIG. 8, it becomes possible to continuously increase the engine output before and after the switching from the normal cam to the small cam.

Figure 10:
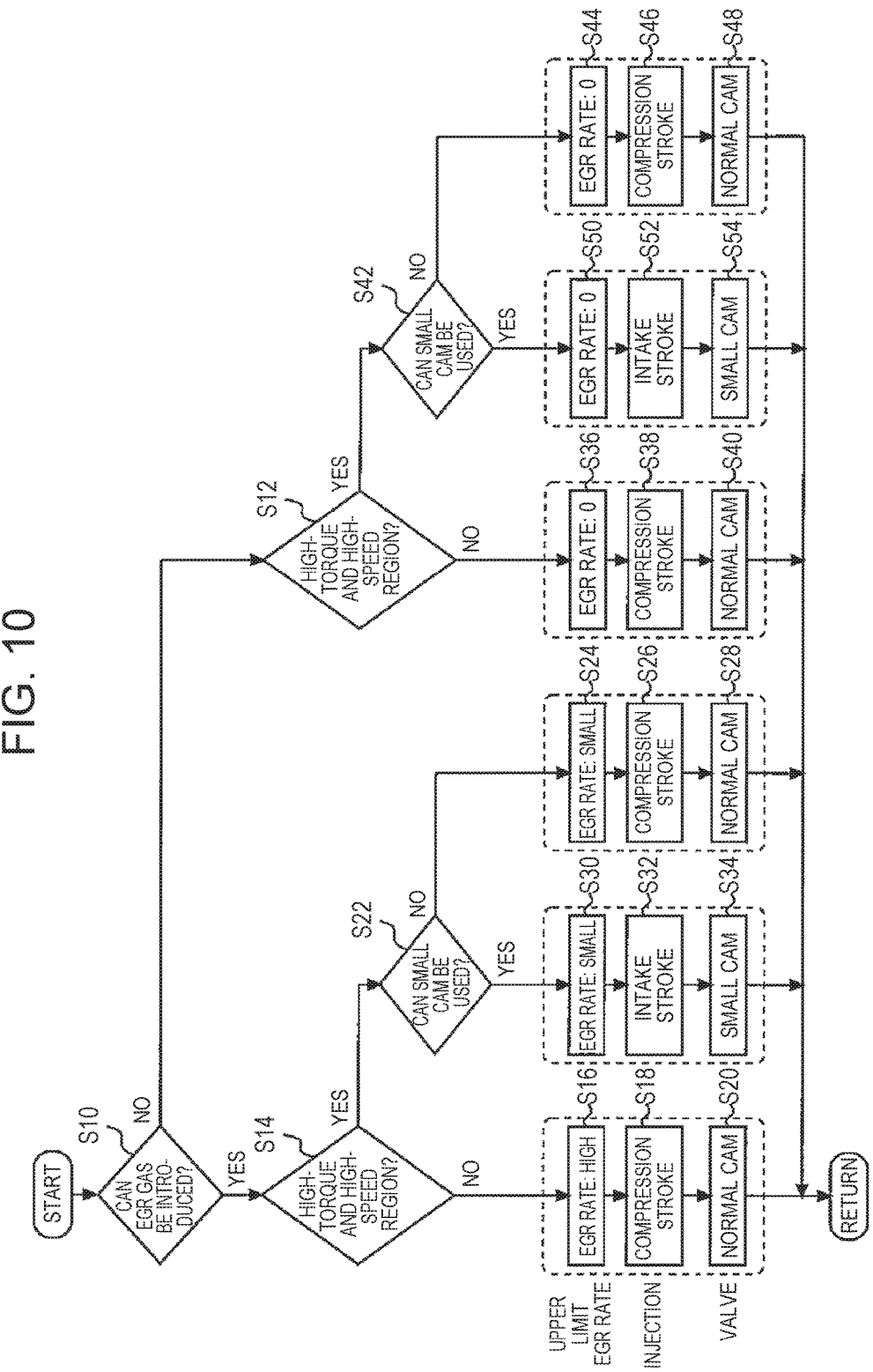
FIG. 10 illustrates one example of a processing routine executed by an ECU in the first embodiment of the present disclosure.

FIG. 10 illustrates one example of a processing routine executed by the ECU in the first embodiment of the present disclosure. The present routine is executed in each prescribed control period (for example, whenever the crankshaft rotates 120°).

In the routine illustrated in FIG. 10, whether or not the EGR gas can be introduced is first determined (step S10). Whether or not the EGR gas can be introduced is determined based on a cooling restriction and a condensed water restriction of the EGR cooler, for example. Examples of the cooling restriction of the EGR cooler include that a gas temperature at an outlet portion of the EGR cooler, a coolant temperature at the outlet portion of the EGR cooler, or a gas temperature in an upstream portion of the compressor is equal to or below a specified temperature. Examples of the condensed water restriction include that the gas temperature at the outlet portion of the intercooler is equal to or above a dew-point temperature. When the EGR cooling restriction is not satisfied, it is determined that enhancement of the thermal efficiency by introduction of the EGR gas is not expectable. When the condensed water restriction is not satisfied, it is determined that condensed water is generated in the outlet portion of the intercooler. Accordingly, when the cooling restriction or the condensed water restriction is not satisfied, it is determined that there is a restriction on an external EGR gas, and processing of step S12 and the subsequent processing are performed (described later in detail).

When the determination result of step S10 is positive, it is determined that there is a restriction on the external EGR gas, and performs processing of step S14 and the subsequent processing. In step S14, it is determined whether or not the operating state of the engine is in a high-torque and high-speed region. The high-torque and high-speed region corresponds to the operation region described in FIG. 4. When the determination result of step S14 is negative, the upper limit of the target EGR rate is set to a maximum value (step S16), the injection timing is set to a crank angle in the compression stroke (step S18), and the normal cam is selected as the driving cam (step S20). Consequently, the engine control is performed in operation regions other than the high-torque and high-speed region described in FIGS. 3 through 4.

When the determination result of step S14 is positive, whether or not the small cam can be used is determined (step S22). Whether or not the small cam can be used is determined based on a turbocharging work restriction, for example. Examples of the turbocharging work restriction include that the atmospheric pressure is equal to or above a specified value or that the back pressure is equal to or below a specified pressure. When the turbocharging work restriction is not satisfied, it is determined that enhancement in the engine output is not expectable even when the normal cam is switched to the small cam. Accordingly, when the turbocharging work restriction is not satisfied, processing of step S24 and the subsequent processing is performed. That is, the upper limit of the target EGR rate is set to a relatively small value (step S24), the injection timing is set to the crank angle in the compression stroke (step S26), and the normal cam is selected as the driving cam (step S28).

When the determination result of step S22 is positive, the upper limit of the target EGR rate is set to a relatively small value (step S30), the injection timing is set to the crank angle in the intake stroke (step S32), and the small cam is selected as the driving cam (step S34). Consequently, the engine control is performed in the high-torque and high-speed region described in FIGS. 3 through 4. When the operating state shifts from the middle-torque and middle-speed region to the high-torque and high-speed region, the change of the target EGR rate or other processing is performed in accordance with the procedure described in FIG. 9. That is, before switching to the small cam, the target EGR rate and the injection timing are changed. Then, when change of the valve closing time of the intake valve is completed, switching to the small cam is started.

The processing of step S12 and the subsequent processing will be described. The processing of step 12 is identical to that of step 14 described before. The processing of steps S36 to S54 subsequent to step S12 is basically identical to the processing of steps S16 to S34 described before. For the details of processing of steps S12, S36 to S54, see the description of the corresponding steps. The processing details of steps S36, S44, S50 are different from those of steps S16 to S34 in that the upper limit of the target EGR rate is set to zero. This is based on the determination result of step S10.

As described in the foregoing, according to the routine illustrated in FIG. 10, when both the condition on introduction of the EGR gas and the condition on use of the small cam are satisfied, the engine control based on the operation regions described in FIGS. 3 through 4 can be performed. Therefore, it becomes possible to suppress decrease in the engine output when the operating state shifts from the middle-torque and middle-speed region to the high-torque and high-speed region.

In the first embodiment described before, the LPL-EGR system 36 illustrated in FIG. 1 is one example of "EGR system" in SUMMARY. The middle-torque and middle-speed region described in FIGS. 3 through 4 is one example of "first operation region" in SUMMARY. The high-torque and high-speed region in FIGS. 3 through 4 is one example of "second operation region" in SUMMARY. The normal cam is one example of "first cam" in SUMMARY. The small cam is one example of "second cam" of SUMMARY. The crank angle section $CA_1$ described in FIG. 5 is one example of "first crank angle section" in SUMMARY. The crank angle section $CA_2$ is one example of "second crank angle section" of SUMMARY.

In the first embodiment described before, the VVT 74 illustrated in FIG. 1 is one example of "rotation phase change mechanism" in SUMMARY.

Next, a second embodiment of the present invention will be described with reference to FIGS. 11 through 13. The fundamental configuration of a system of the second embodiment is in common with the configuration example described in FIG. 1. Therefore, the description about the common system configuration will be omitted.

Figure 11:
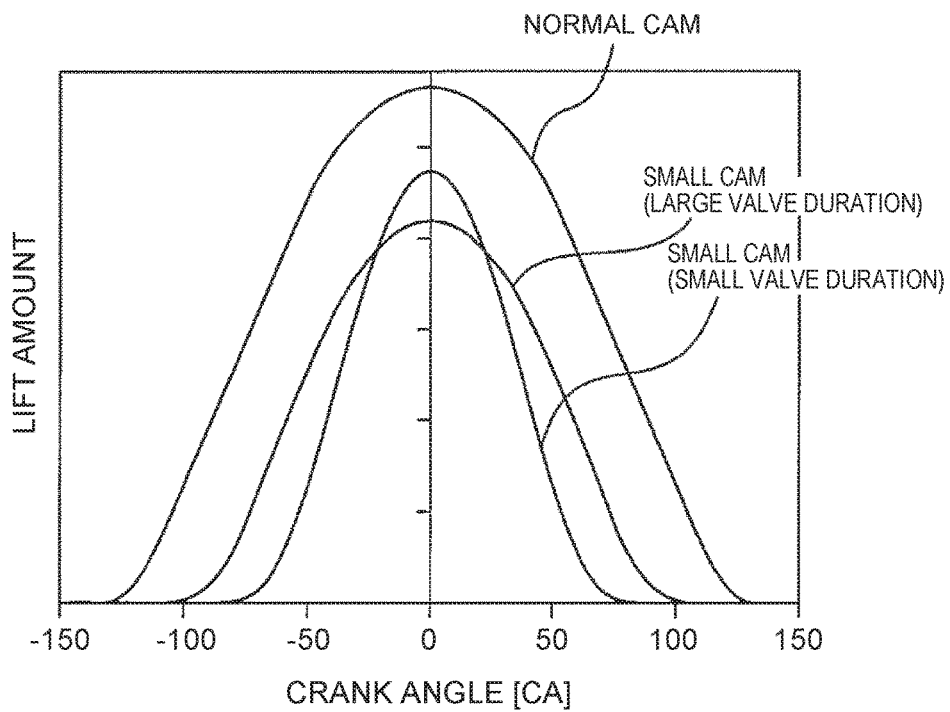
FIG. 11 is an explanatory view illustrating one example of cam profiles of three types of intake cams included in a system according to a second embodiment of the present disclosure.

FIG. 11 is an explanatory view illustrating one example of the cam profiles of three types of intake cams included in the system according to the second embodiment of the present invention. As illustrated in FIG. 11, the system according to the second embodiment includes three types of intake cams: a normal cam; and two types of small cams. Two types of small cams are smaller in valve duration and lift amount than the normal cam. However, one of the small cams has the same valve duration and lift amount as the small cam of the first embodiment. The other small cam is smaller in valve duration than the small cam of the first embodiment, and has a lift amount equal to or above the lift amount of the small cam of the first embodiment. Hereinafter, for the sake of description, the one small cam having the cam profile as the small cam of the first embodiment is also called "small cam (large valve duration)." The other small cam is also called "small cam (small valve duration)."

The normal cam, the small cam (large valve duration), and the small cam (small valve duration) are supported by a camshaft rotating in synchronization with a crankshaft. The camshaft is provided with a VVT as in the case of the first embodiment.

In the second embodiment, engine control using a combination of the target EGR rate described in FIG. 3 and the closing time of the intake valve based on three types of intake cams is performed. FIG. 12 illustrates one example of a relation between the engine operation region and the cams that drive the intake valve. As illustrated in FIG. 12, in most of the operation regions, the normal cam is selected. The small cam (large valve duration) is selected only in the high-torque and high-speed region. The engine control so far is the same as the engine control of the first embodiment. In the engine control of the second embodiment, the small cam (small valve duration) is selected in the low speed region. More specifically, the small cam (small valve duration) is selected in a high-torque and low-speed region, and a low-torque and low-speed region. In the second embodiment, the relation illustrated in FIG. 12 is stored in the ROM of the ECU. The switching operation by the cam switching mechanism is controlled by applying an actual operating state to the relation.

Figure 13:
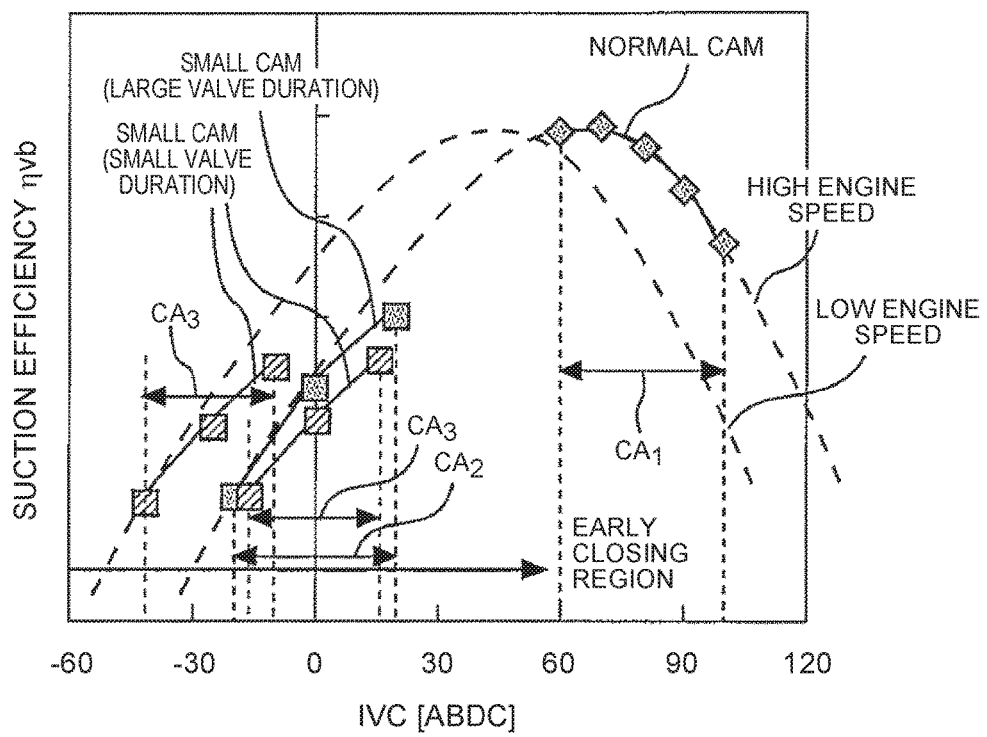
FIG. 13 is an explanatory view illustrating one example of the closing time of the intake valve.

FIG. 13 is an explanatory view illustrating one example of the closing time of the intake valve. As illustrated in FIG. 13, when the driving cam is the normal cam, the intake valve is closed in the crank angle section $CA_1$. When the driving cam is the small cam (large valve duration), the intake valve is closed early in the crank angle section $CA_2$. The engine control operation is the same as the engine control of the first embodiment. In the engine control of the second embodiment, when the driving cam is the small cam (small valve duration), the intake valve is closed early in a crank angle section $CA_3$ that is narrower than the crank angle section $CA_2$. The suction efficiency illustrated in FIG. 13 may be obtained under the operating condition where the engine speed and the turbocharging pressure are fixed, for example. In the case of the low engine speed, the crank angle that maximizes the suction efficiency is positioned more advanced than that in the case of the high engine speed. Accordingly, although the length of the section itself does not change, the crank angle section $CA_3$ is positioned more advanced in the case of the low engine speed than in the case of the high engine speed.

As described in the first embodiment, knocking tends to occur in the middle torque to the high torque region. To cope with this situation, in the second embodiment, setting of the target EGR rate is performed as described in FIG. 3. In addition, the small cam (large valve duration) having the same cam profile as the small cam described in the first embodiment is selected in the high-torque and high-speed region. Therefore, decrease in the knocking limit can be suppressed in the high-torque and high-speed region. However, the fact that knocking tends to occur in the high torque region signifies that the high-torque and low-speed region is also included in the target region for suppressing the decrease in the knocking limit. Accordingly, when the engine operating state shifts as indicated by an operation line illustrated in FIG. 12, the target EGR rate reduces from the maximum value to a current operation point. Therefore, if the normal cam should continue to be selected over the period of the operation line, the state where an actual compression ratio is high continues although the knocking limit lowers with decrease in the target EGR rate. Therefore, in order to avoid occurrence of knocking, there is no other choice but to delay the ignition timing, and this leads to the situation where decrease in engine output is unavoidable.

To cope with this situation, in the second embodiment, the small cam (small valve duration) is selected in the high-torque and low-speed region, so that the state where the actual compression ratio is high can be eliminated. As already described, the small cam (small valve duration) is smaller in valve duration that the small cam (large valve duration). Accordingly, when the small cam (small valve duration) is used as the driving cam, the intake valve can be closed earlier than the case of using the small cam (large valve duration) as the driving cam, so that the actual compression ratio and the suction efficiency can considerably be lowered. Therefore, the decrease in the knocking limit can be suppressed. In the high-torque and low-speed region, the back pressure is less than the stipulated value. Accordingly, the WGV is hardly opened before and after the switching to the small cam (small valve duration). That is, in the high-torque and low-speed region, the suction efficiency is intentionally decreased and the delay of the ignition timing is avoided by switching to the small cam (small valve duration), so that the engine output is enhanced.

In the second embodiment, the small cam (small valve duration) is selected also in the low-torque and low-speed region. Therefore, it is also possible to reduce pumping loss in the low-torque and low-speed region and to thereby enhance the engine output in the operation region.

A specific example of the engine control in which the small cam (large valve duration) is selected in the high-torque and high-speed region can be described by replacing the term "small cam" with the term "small cam (large valve duration)" in the above description of FIGS. 8 through 10. A specific example of the engine control in which the small cam (small valve duration) is selected in the high-torque and low-speed region can be described by replacing the term "small cam" with the term "small cam (small valve duration)" in the above description of FIGS. 8 through 10 and by further replacing the term "high-torque and high-speed region" with the term "high-torque and low-speed region." A specific example of the engine control in which the small cam (small valve duration) is selected in the low-torque and low-speed region can be described by replacing the term "small cam" with the term "small cam (small valve duration)" in the above description of FIGS. 8 through 10 and by further replacing the term "high-torque and high-speed region" with the term "low-torque and low-speed region."

Figure 12:
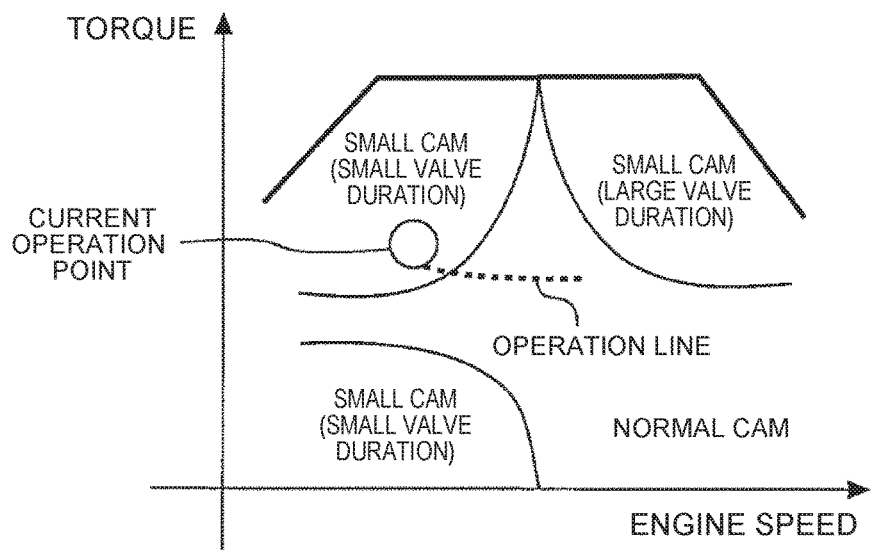
FIG. 12 illustrates one example of a relation between the engine operation region and the cams that drive the intake valve.

In the second embodiment described before, the high-torque and low-speed region described in FIG. 12 is one example of "third operation region" in SUMMARY. The small cam (large valve duration) is one example of "second cam" of SUMMARY. The small cam (small valve duration) is one example of "third cam" of SUMMARY. The crank angle section $CA_3$ described in FIG. 13 is one example of "third crank angle section" in SUMMARY.

Next, a third embodiment of the present invention will be described with reference to FIGS. 14 through 15. The fundamental configuration of a system of the third embodiment is in common with the configuration example described in FIG. 1. Therefore, the description about the common system configuration will be omitted.

The system of the third embodiment is a hybrid system including an internal combustion engine and in addition, a motor-generator (MG) as a driving source of the vehicle. The hybrid system includes publicly known configuration including a driving shaft, a power split device, a power control unit (PCU), and a battery, other than the MG. Since the configuration of the hybrid system is publicly known, and there are no limitations on the configuration in the present invention, further description about the hybrid system is omitted.

Figure 14:
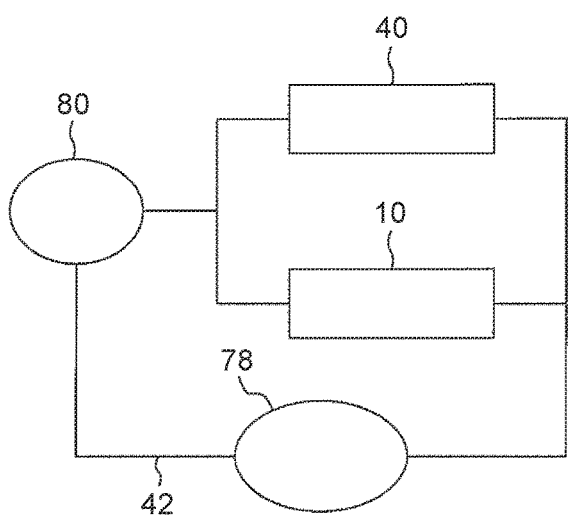
FIG. 14 is an explanatory view illustrating a cooling system in a system according to a third embodiment of the present disclosure.
Figure 15:
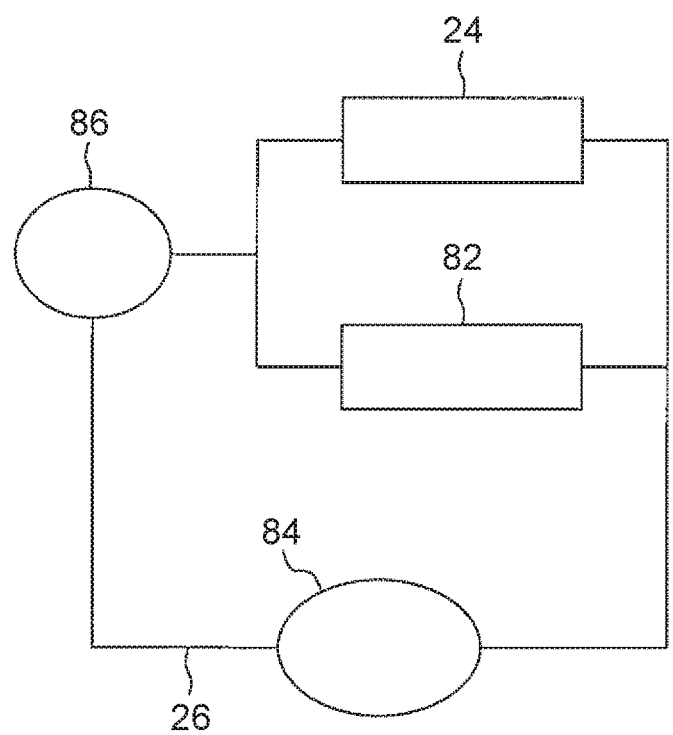
FIG. 15 is an explanatory view illustrating the cooling system in the system according to the third embodiment of the present disclosure.

FIGS. 14 through 15 are explanatory views illustrating a cooling system in the system according to the third embodiment of the present invention. The system of the third embodiment includes two cooling systems. The cooling system illustrated in FIG. 14 circulates a relatively high-temperature coolant among the internal combustion engine 10, the EGR cooler 40, and a radiator 78. In the cooling system, the coolant flowing into a water pump 80 from the radiator 78 is sent out to the internal combustion engine 10 and the EGR cooler 40, and is returned to the radiator 78. The cooling system illustrated in FIG. 15 circulates a relatively low-temperature coolant among an HV system device 82 (for example, a boost converter, and an inverter of the PCU), the intercooler 24, and a radiator 84. In the cooling system, the coolant flowing into the water pump 86 from the radiator 84 is sent out to the HV system device 82 and the intercooler 24, and is returned to the radiator 84.

As described in the first embodiment, when the driving cam is switched to the small cam in the high-torque and high-speed region, the back pressure decreases with decrease in the suction efficiency. Since the opening degree of the WGV reduces as the back pressure decreases, it becomes possible to increase the turbocharging pressure. However, when the turbocharging pressure increases, a cooling request in the intercooler increases in proportion. Accordingly, in the case of the cooling system where the coolant is shared by the intercooler 24 and HV system device 82 as in the cooling system illustrated in FIG. 15, the HV system device 82 may be undercooled. Accordingly, in the third embodiment, a condition that the temperature of the coolant fed to the cooling system illustrated in FIG. 15 is equal to or below a specified temperature is added to the use condition of the small cam in the first embodiment described before. When such use conditions are set for the small cam, it becomes possible to avoid undercooling of the HV system device.

A specific example of the engine control in the third embodiment may be described by adding determination about the temperature of the coolant fed to the cooling system illustrated in FIG. 15 to the determination regarding the turbocharging work restriction in the processing of step S22 in FIG. 10.

OTHER EMBODIMENTS

In the first through third embodiments, the turbocharger that rotates the turbine with exhaust gas energy has been described as an example. However, the turbocharger may be replaced with an electric supercharger that drives the compressor with a motor, or replaced with a mechanical supercharger that drives the compressor with the internal combustion engine.

In the third embodiment, the cooling system where the intercooler and the HV system device share the coolant has been described as an example. However, the heat exchanger that shares the coolant with the intercooler is not limited to the HV system device. When other heat exchangers are incorporated in the cooling system illustrated in FIG. 15, the configuration of the third embodiment may be adopted, and the determination about the temperature of the coolant fed to the cooling system illustrated in FIG. 15 may be added to the use conditions of the small cam.

What is claimed is:

1. An internal combustion engine system, comprising:
    a turbocharged engine including a plurality of intake cams different in cam profile, an EGR system, and an ignition device, the intake cams being configured to drive an intake valve, the EGR system being configured to introduce exhaust gas flowing through an exhaust system, as external EGR gas, into an intake system, the ignition device being configured to ignite an air-fuel mixture in a cylinder; and
    an electronic control unit, the electronic control unit being configured to set a target value of an EGR rate in accordance with an operating state identified with engine torque and engine speed, the EGR rate being expressed as a ratio of the external EGR gas to intake air,
    in a first operation region where the target value of the EGR rate is set to a specified EGR rate, the electronic control unit being configured to select a first cam as a driving cam of the intake valve and being configured to set closing timing of the intake valve to a first crank angle section, the first crank angle section including a crank angle that offers highest suction efficiency under a condition where the engine speed and turbocharging pressure are fixed, and
    in a second operation region, the electronic control unit being configured to select a second cam as the driving cam, the second cam being smaller in valve duration and lift amount than the first cam, and being configured to set the closing timing to a second crank angle section and change ignition timing of the ignition device to a more advanced side than the ignition timing of the ignition device in the first operation region, the second operation region being positioned closer to a high-speed side than the first operation region, the second operation region having the target value of the EGR rate set to a value lower than the specified EGR rate, the second crank angle section being positioned at a more advanced side than the first crank angle section and being lower in suction efficiency than the first crank angle section.

2. The internal combustion engine system according to claim 1, wherein
    the electronic control unit is configured to wait for the switching of the driving cam until change of an actual EGR rate is completed when switching the driving cam from the first cam to the second cam with a shift of the operating state from the first operation region to the second operation region.

3. The internal combustion engine system according to claim 1, wherein
    the turbocharged engine includes an injector that supplies fuel into the cylinder,
    the electronic control unit is configured to control the injector such that the fuel is injected in a compression stroke when the operating state is in the first operation range, and
    the electronic control unit is configured to control the injector such that the fuel is injected in an intake stroke when the operating state is in the second operation range.

4. The internal combustion engine system according to claim 3, wherein
    the electronic control unit is configured to wait for the switching of the driving cam until change of injection timing of the injector is completed when switching the driving cam from the first cam to the second cam with a shift of the operating state from the first operation region to the second operation region.

5. The internal combustion engine system according to claim 1, wherein
    the turbocharged engine includes a camshaft that supports the plurality of intake cams, and a rotation phase change mechanism that changes a rotation phase of the camshaft relative to a crankshaft, and
    when switching the driving cam from the first cam to the second cam with a shift of the operating state from the first operation region to the second operation region, the electronic control unit is configured to change the rotation phase such that the suction efficiencies before and after the switching of the driving cam coincide and wait for the switching of the driving cam until change of the rotation phase is completed.

6. The internal combustion engine system according to claim 1, wherein
    the turbocharged engine includes a liquid-cooled intercooler that cools the intake air flowing through the intake system, and a heat exchanger that shares a coolant with the intercooler, and
    the electronic control unit is configured not to perform switching of the driving cam when the following conditions i) and ii) are both satisfied,
    i) switching the driving cam from the first cam to the second cam with a shift of the operating state from the first operation region to the second operation region, and
    ii) temperature of the coolant fed to the intercooler and the heat exchanger is higher than a specified temperature.

7. The internal combustion engine system according to claim 1, wherein
    in a third operation region, the electronic control unit is configured to select a third cam as the driving cam, the third cam is smaller in lift amount than the first cam and smaller in valve duration than the second cam, and is configured to set the closing timing to a third crank angle section and change the ignition timing of the ignition device to a more advanced side than the ignition timing of the ignition device in the first operation region, the third operation region being positioned closer to a low speed side than the first operation region, the third operation region having the target value of the EGR rate set to a value lower than the specified EGR rate, the third crank angle section being positioned at a more advanced side than the first crank angle section and being narrower than the second crank angle section.

8. The internal combustion engine system according to claim 1, wherein the turbocharged engine has a geometric compression ratio defined as 11 or more.

9. A control method for an internal combustion engine, the internal combustion engine including a turbocharged engine and an electronic control unit, the turbocharged engine including a plurality of intake cams different in cam profile, an EGR system, and an ignition device, the intake cams being configured to drive an intake valve, the EGR system being configured to introduce exhaust gas flowing through an exhaust system, as an external EGR gas, in to an intake system, the ignition device being configured to ignite an air-fuel mixture in a cylinder, the electronic control unit being configured to set a target value of an EGR rate in accordance with an operating state identified with engine torque and engine speed, the EGR rate being expressed as a ratio of the external EGR gas to intake air, the control method comprising:

in a first operation region where the target value of the EGR rate is set to a specified EGR rate, selecting, via the electronic control unit, a first cam as a driving cam of the intake valve, and setting, via the electronic control unit, closing timing of the intake valve to a first crank angle section including a crank angle that offers a highest suction efficiency under a condition where the engine speed and turbocharging pressure are fixed; and in a second operation region, selecting, via the electronic control unit, a second cam as the driving cam, setting, via the electronic control unit, the closing timing to a second crank angle section positioned at a more advanced side than the first crank angle section, and changing, via the electronic control unit, ignition timing of the ignition device to a more advanced side than the ignition timing of the ignition device in the first operation region, the second operation region positioned closer to a high-speed side than the first operation region, the second operation region having the target value of the EGR rate set to a value lower than the specified EGR rate, the second cam being smaller in valve duration and lift amount than the first cam, the second crank angle section being lower in suction efficiency than the first crank angle section.

* * * * *